United States Patent Office 3,072,651  
Patented Jan. 8, 1963

3,072,651  
DIHYDROBENZOTHIADIAZINES  
Harry Louis Yale and Jack Bernstein, New Brunswick, N.J., assignors to Olin Mathieson Chemical Corporation, New York, N.Y., a corporation of Virginia  
No Drawing. Filed Feb. 19, 1959, Ser. No. 794,262  
5 Claims. (Cl. 260—243)

This invention relates to new dihydrobenzothiadiazine derivatives, and more particularly to new trifluoromethyl-dihydrobenzothiadiazinesulfonamide derivatives of the general formula

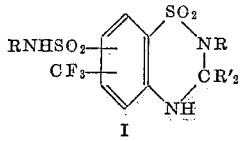

as well as the alkali metal salts thereof, wherein each R and R' represents hydrogen, lower alkyl or aryl of less than twelve carbon atoms, at least one R being aryl. [By "aryl" is meant hydrocarbon aromatic radicals of less than twelve carbon atoms, such as phenyl, tolyl, xylyl and naphthyl, as well as simply substituted derivatives thereof, such as halo derivatives (e.g. the chlorphenyls and bromphenyls), nitro derivatives (e.g. 4-nitrophenyl), amino derivatives (e.g. 4-aminophenyl), sulfamyl derivatives, and lower alkoxy derivatives (e.g. anisolyl, phenetolyl, and the dimethoxy derivatives of phenyl)].

The new dihydrobenzothiadiazines of this invention are physiologically active compounds which possess both diuretic and anti-hypertensive activities. Thus, these compounds are administrable parenterally and (preferably) orally in the treatment of congestive heart failure, being uniquely suitable for this and other conditions where both the diuretic and anti-hypertensive activities are desirable.

The compounds of this invention are prepared by the process of this invention which essentially comprises reacting a compound of the general formula

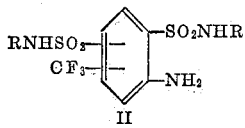

wherein R is as hereinbefore defined, which are new compounds, with a compound of the formula R'$_2$CX$_2$, wherein R' is as hereinbefore defined, and X is halo (e.g. bromo and chloro), lower alkoxy (e.g. methoxy and ethoxy), and the X's together is keto (oxo). The reaction is preferably conducted at an elevated temperature, and results in the preparation of the final products of this invention.

Suitable reactants include lower alkanals, such as formaldehyde, used as such or preferably in a commercially available form such as an aqueous solution (e.g. formalin) or a polymeric state (e.g. trioxane and paraformaldehyde), acetaldehyde (or a commercial form thereof such as paraldehyde), propionaldehyde, butyraldehyde, valeraldehyde, caproaldehyde, enanthaldehyde, and caprylaldehyde; lower alkanones, such as acetone, ethyl methyl ketone, methyl propyl ketone, methyl isopropyl ketone, pentanone-3, the hexanones, the petanones, and the octanones; aromatic aldehydes of less than thirteen carbon atoms, such as benzaldehyde, o,m, and p-tolualdehyde, the naphthaldehydes (e.g. 2-naphthaldehyde), the halobenzaldehydes (e.g. p-chlorobenzaldehyde), the sulfamylbenzaldehydes (e.g. p-sulfamylbenzaldehyde), and the lower alkoxybenzaldehydes (e.g. anisaldehyde); aromatic ketones of less than twenty-five carbon atoms, such as phenyl-lower alkanones (e.g. acetophenone, propiophenone, and butyrophenone), benzophenone, and substituted benzophenones, such as o-benzoylaniline and the di-o, m-, and p-tolyl ketones; the acetyl and ketal derivatives thereof (e.g. methylal and diethoxymethane); and the dihalides thereof (e.g. methylene dibromide, 1,1-dichloroethane, and benzal chloride).

In reactions involving an aldehyde, ketone, acetal or ketal, an acid catalyst, such as dilute aqueous hydrochloric, phosphoric, p-toluene sulfonic, trichloroacetic or sulfuric acid is preferably present, whereas reactions involving a dihalide are preferably conducted under basic conditions followed by treatment with an acid. The free dihydrobenzothiadiazine dioxides, thus formed, can then, if desired, be treated with alcoholic alkali metal hydroxides (e.g. potassium hydroxide), whereby the alkali metal salts are formed.

The intermediates of Formula II are new compounds which can be prepared from the corresponding amino-α,α,α-trifluorotoluenesulfonyl halide derivatives. If a symmetrical derivative is desired, an amino-α,α,α-trifluorotoluenedisulfonyl halide (preferably chloride), wherein at least one sulfonyl halide group is ortho to the amino radical, is reacted with a primary aryl amine, thereby yielding the new intermediates of this invention of the Formula II wherein both R's are aryl. The amine is present in at least stoichiometric amount (preferably in excess). Thus, for example if an excess of phenylamine is used, an amino-α,α,α-trifluorotoluene - N,N - diphenyldisulfonamide is formed.

If an unsymmetrical intermediate is desired (a compound of Formula II wherein the R's are different), then a nitro-α,α,α-trifluorotoluene monosulfonyl halide (preferably chloride), wherein the sulfonyl halide group is ortho to the nitro group, is first amidated by reacting with ammonia, a primary lower alkyl amine, or an aryl amine, the nitro group is then reduced to an amino radical, a second sulfonyl halide radical is introduced, and this sulfonyl halide radical is then amidated using a different basic group (i.e. ammonia or a primary lower alkyl amine).

Suitable amine reactants include ammonia, methyl amine, ethylamine, n, and isopropylamine, the butylamines, the pentylamines, the hexylamines, the heptylamines, the octylamines, aniline, the chloroanilines, the toluidines, and the anisidines. Suitable mono and disulfonyl halide reactants can be prepared as disclosed in our applications, Serial No. 698,377, filed November 25, 1957, now Patent No. 3,040,042, issued June 19, 1962, and Serial No. 794,247, filed on even date herewith, and specifically include 5-amino-α,α,α-trifluoro-2,4-toluenedisulfonyl chloride, 4-amino-α,α,α-trifluoro-3,5-toluene disulfonyl chloride, 2-amino-α,α,α-trifluoro-3,5-toluenedisulfonyl chloride, 3-nitro-α,α,α-trifluoro-4-toluenesulfonyl chloride, 4-nitro-α,α,α-trifluoro - 3 - toluenesulfonyl chloride, and 2-nitro-α,α,α-trifluoro-3-toluenesulfonyl chloride.

The following examples illustrate the invention (all temperatures being in centigrade):

EXAMPLE 1

*3,4-Dihydro-N,2-Diphenyl-6-Trifluoromethyl-1,2,4-Benzothiadiazine-7-Sulfonamide 1,1-Dioxides*

(A) PREPARATION OF 5-AMINO-α,α,α-TRIFLUORO-N,N'-DIPHENYL 2,4-TOLUENEDISULFONAMIDE

To 100 ml. of aniline and 500 ml. of benzene is added dropwise, with stirring, 250 ml. of a tetrachloroethane solution of 90 g. of 5-amino-α,α,α-trifluoro-2,4-toluenedisulfonyl chloride. The mixture is then heated to reflux on the steam bath for two hours, the solvents are removed by distillation under reduced pressure, the residue suspended in water and the solid filtered. The air-dried solid is then recrystallized from aqueous alcohol to give the pure product.

(B) PREPARATION OF 3,4-DIHYDRO-N,2-DIPHENYL-6-TRIFLUOROMETHYL-1,2,4-BENZOTHIADIAZINE-7-SULFONAMIDE 1,1-DIOXIDE 9.4 g. of the disulfonamide obtained in step A, 2.5 ml. of 37% formalin, 5 ml. of 10% hydrochloric acid and 100 ml. of 95% ethanol are refluxed for two hours and then concentrated to dryness from the steam bath. At white crystalline solid is formed, which is recrystallized from aqueous alcohol to give the pure product.

Similarly, by substituting an equivalent amount of p-chloroaniline, m-toluidine and p-anisidine for the aniline in step A of Example 1, 5-amino-α,α,α-trifluoro-N,N'-di-4'-chlorophenyl-2,4-toluenedisulfonamide, 5-amino-α,α,α-trifluoro-N,N'-di-3'-tolyl-2,4-toluenedisulfonamide, and 5-amino - α,α,α - trifluoro - N,N' - di-4'-methoxyphenyl-2,4-toluenedisulfonamide are obtained respectively. These intermediates are converted by the method step B to 3,4-dihydro-N,2-di-4'-chlorophenyl - 6 - trifluoromethyl-1,2,4-benzothiadiazine-7-sulfonamide 1,1-dioxide, 3,4-dihydro-N,2-di-3'-tolyl-6-trifluoromethyl - 1,2,4 - benzothiadiazine-7-sulfonamide 1,1-dioxide, and 3,4-dihydro-N,2-di-4'-methoxyphenyl-6-trifluoromethyl-1,2,4 - benzothiadiazine-7-sulfonamide 1,1-dioxide, respectively.

EXAMPLE 2

*3,4-Dihydro-N,2-Diphenyl-5-Trifluoromethyl-1,2,4-Benzothiadiazine-7-Sulfonamide 1,1-Dioxide*

Following the procedure of Example 1, but substituting an equal amount of 2-amino-α,α,α-trifluoro-3,5-toluenedisulfonyl chloride for the 5-amino-α,α,α-trifluoro-2,4-toluene disulfonyl chloride in step A, there is first obtained 2-amino-α,α,α-trifluoro-N,N'-diphenyl-3,5-toluenedisulfonamide and then by the procedure of step B, 3,4-dihydro-N,2-diphenyl-5-trifluoromethyl - 1,2,4 - benzothiadiazine-7-sulfonamide 1,1-dioxide.

EXAMPLE 3

*3,4-Dihydro-N,2-Diphenyl-7-Trifluoromethyl-1,2,4-Benzothiadiazine-5-Sulfonamide 1,1-Dioxide*

Following the procedure of Example 1, but substituting an equal amount of 4-amino-α,α,α-trifluoro-3,5-toluenedisulfonyl chloride for the 5-amino-α,α,α-trifluoro-2,4-toluenedisulfonyl chloride in step A, there is first obtained 4-amino-α,α,α-trifluoro-N,N'-diphenyl-3,5-toluenedisulfonamide and then by the procedure of step B, 3,4-dihydro-N,2-diphenyl-7-trifluoromethyl - 1,2,4 - benzothiadiazine-5-sulfonamide 1,1-dioxide.

EXAMPLE 4

*3,4-Dihydro-N-Phenyl-6-Trifluoromethyl-1,2,4-Benzothiadiazine-7-Sulfonamide 1,1-Dioxide*

(A) PREPARATION OF 2-AMINO-4-TRIFLUOROMETHYL-5-N-PHENYL-SULFAMYLBENZENESULFONAMIDE

To 20 ml. of aniline in 150 ml. of benzene there is added dropwise with vigorous stirring 250 ml. of tetrachloroethane solution of 33.8 grams of 2-amino-4-trifluoromethyl-5-chlorosulfonylbenzenesulfonamide. The mixture is then heated on a steam bath for two hours, the solvents then are removed by distillation under reduced pressure and the residue suspended in water. The solid is filtered and air-dried. It is recrystallized from aqueous alcohol to give the pure product.

(B) PREPARATION OF 3,4-DIHYDRO-N-PHENYL-6-TRIFLUOROMETHYL-1,2,4-BENZOTHIADIAZINE-7-SULFONAMIDE, 1,1-DIOXIDE 8 grams of the disulfanamide obtained in step A, 2.5 ml. of 37% formalin and 5 ml. of 10% hydrochloric acid are refluxed for two hours and then concentrated to dryness from the steam bath. The white crystalline residue is recrystallized from aqueous alcohol to give the pure product having the formula

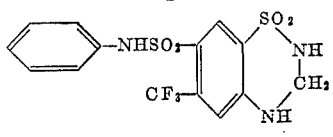

EXAMPLE 5

*3,4-Dihydro - N - Phenyl - 3 - Methyl-3-Ethyl-6-Trifluoromethyl-1,2,4-Benzothiadiazine-7-Sulfonamide, 1,1-Dioxide*

A mixture of 7.9 grams of 2-amino-4-trifluoromethyl-5-N-phenylsulfamylbenzene sulfonamide, 4 grams of ethyl methyl ketone, 5 ml. of 10% hydrochloric acid and 100 ml. of 95% ethanol is refluxed for three hours, and is then concentrated to dryness. The residue is crystallized twice from aqueous alcohol to give the desired pure product.

EXAMPLE 6

*3,4-Dihydro-N,2,3-Triphenyl-6-Trifluoromethyl-1,2,4-Benzothiadiazine-7-Sulfonamide 1,1-Dioxide*

A mixture of 12 g. of 5-amino-α,α,α-trifluoro-N,2-diphenyl-2,4-toluenedisulfonamide, 5.3 g. of benzaldehyde, and 100 ml. of 95% ethanol is refluxed for three hours, then concentrated to dryness. The solid residue is stirred into 750 ml. of boiling water and filtered quickly. The insoluble material is recrystallized from aqueous alcohol to give the pure product.

The invention may be variously otherwise embodied within the scope of the appended claims.

What is claimed is:

1. A compound selected from the group consisting of dihydrobenzothiadiazines of the formula

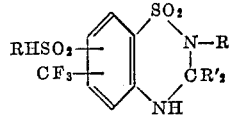

and alkali metal salts thereof, wherein each R and each R' is selected from the group consisting of hydrogen, lower alkyl and aryl of less than twelve carbon atoms selected from the group consisting of hydrocarbon aryl and halo, nitro, amino, sulfamyl and lower alkoxy substituted derivatives thereof, at least one R being said aryl radical.

2. 3,4-dihydro - N,2 - diphenyl-6-trifluoromethyl-1,2,4-benzothiadiazine-7-sulfonamide 1,1-dioxide.

3. 3,4-dihydro - N,2 - diphenyl-5-trifluoromethyl-1,2,4-benzothiadiazine-7-sulfonamide 1,1-dioxide.

4. 3,4-dihydro-N,2-diphenyl - 7 - trifluoromethyl - 1,2,4-benzothiadiazine-5-sulfonamide 1,1-dioxide.

5. 3,4-dihydro-N,2,3-triphenyl-6-trifluoromethyl - 1,2,4-benzothiadiazine-7-sulfonamide 1,1-dioxide.

References Cited in the file of this patent

UNITED STATES PATENTS

| | | |
|---|---|---|
| 2,224,144 | Dickey | Dec. 10, 1940 |
| 2,358,465 | McNally | Sept. 19, 1944 |
| 2,809,194 | Novello | Oct. 8, 1957 |
| 2,894,948 | De Stevens | July 14, 1959 |
| 2,910,476 | Novello | Oct. 27, 1959 |

OTHER REFERENCES

Fischer: Berichte Handbuch der Org. Chem., vol. 24, pp. 3785–3808 (1891).

Lustig et al.: Monatsh. fur Chemie, vol. 48, pp. 87–97 (1927).

Freeman et al.: J. Orig. Chem., vol. 16, pp. 815, 816, 818, 821, 828 (1951).

Herrmann et al.: Texas State J. of Medicine (December 1958), pp. 854–8.

The Wall Street Journal, Nov. 5, 1958, p. 19 (Washington, D.C. edition).

De Stevens et al.: Experientia, vol. 14, p. 463.